No. 682,423.

P. PATTERSON.
METHOD OF MAKING LAP WELD TUBING.
(Application filed Jan. 5, 1901.)

Patented Sept. 10, 1901.

(No Model.)

Witnesses:

Inventor:
Peter Patterson
By Kay Totten
Attorneys.

UNITED STATES PATENT OFFICE.

PETER PATTERSON, OF McKEESPORT, PENNSYLVANIA, ASSIGNOR TO THE NATIONAL TUBE COMPANY, OF NEW YORK, N. Y.

METHOD OF MAKING LAP-WELD TUBING.

SPECIFICATION forming part of Letters Patent No. 682,423, dated September 10, 1901.

Application filed January 5, 1901. Serial No. 42,159. (No specimens.)

*To all whom it may concern:*

Be it known that I, PETER PATTERSON, a resident of McKeesport, in the county of Allegheny and State of Pennsylvania, have invented a new and useful Improvement in Methods of Making Lap-Weld Tubing; and I do hereby declare the following to be a full, clear, and exact description thereof.

My invention relates to a method of making lap-weld tubing, and has for its object a method whereby lap-weld tubing may be formed with walls of substantially the same thickness at all points.

Lap-weld tubing, as is well known, is formed by taking a plate of metal and preferably scarfing the edges thereof and then bending said plate into tubular form, with the edges overlapped. This bent-up plate or "skelp," as it is called, is then raised to a welding heat and the overlapping edges welded together by passing the skelp between welding-rolls and over a ball or mandrel lying in the pass of said rolls. The plates from which the tubes are made are generally of the same thickness throughout, except for the scarfed edges, and consequently when the edges are overlapped there is a greater thickness of metal on this side of the ball or mandrel than at any other point. As the pass of the welding-rolls is circular and said rolls bear on the heated skelp on all points of its circumference, it follows that the most pressure is exerted on the skelp on the line passing through the center of the ball or mandrel and through the overlapping edges of the skelp. As a consequence the ball or mandrel is forced into the metal of the skelp at a point opposite the overlapped edges of the skelp, and the welded tube as it emerges from the rolls has its walls thickest on the line where the weld is made, with a correspondingly thinner portion diametrically opposite said line.

It is the object of my invention to overcome this defect and to provide a method of making such lap-weld tubes whereby they will have walls of substantially the same thickness at all points.

To this end it consists in forming the plate from which the tube is made with a rib or thickened portion along its transverse center, which rib or thickened portion lies diametrically opposite the overlapped edges of the plate when the same is bent up into skelp form and which when the tube is welded over the mandrel balances or compensates for the added thickness of metal on the opposite side due to the overlapping edges of the skelp.

Figure 1:
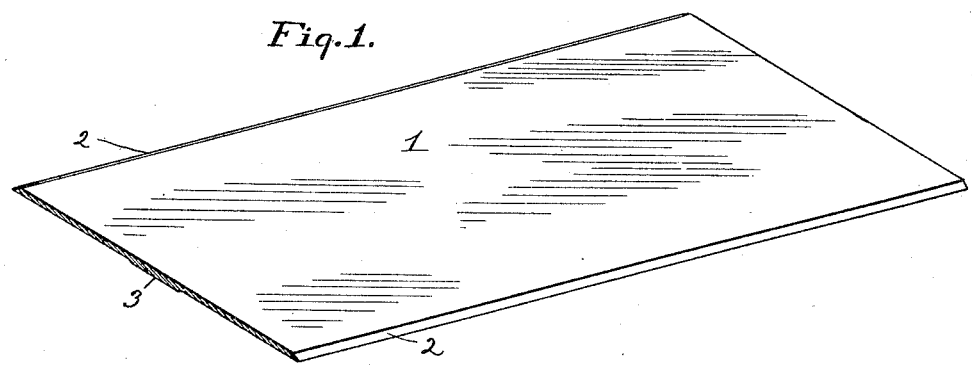
Figure 2:
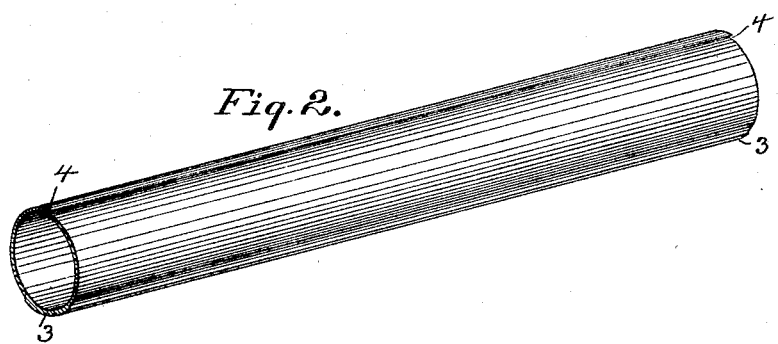
Figure 3:
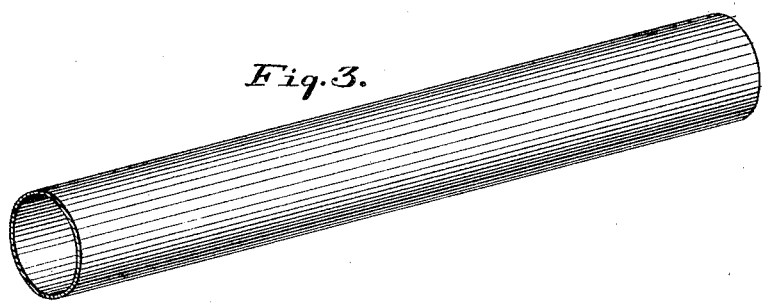

In the accompanying drawings, Figure 1 is a perspective view of a portion of a plate from which the tube is made. Fig. 2 is a similar view of the same bent into skelp form with the edges overlapped, and Fig. 3 is a similar view of the finished tube.

The plate 1 will be of a thickness and width corresponding to the size and strength of tube desired. The edges of the plate are scarfed or beveled, as at 2, so as to form a neat lap-joint, as is well known in the art. The plate is provided along its transverse center with a thickened portion or rib 3, which thickened portion extends longitudinally throughout the length of the plate and is of such thickness and width as to completely balance the overlapping scarf edges of the plate. The faces of said plate on each side of this longitudinal rib are substantially parallel from said rib to the scarfed edges 2 of the plate. This plate is then heated in the ordinary manner, as is well known in the art, and bent into the form shown in Fig. 2, and is then termed a "skelp," in which the scarfed edges 2 of the plate overlap, as at 4, and diametrically opposite said overlapped portion is the thickened portion or rib 3. This skelp is then raised to a welding heat, after which it is passed through welding-rolls and over a ball or mandrel lying in the pass of such rolls, which is the ordinary manner of forming lap-welded tubing, and further description thereof is not necessary, as it will be readily understood by those skilled in the art. The skelp as it passes through the welding-rolls and over the mandrel is subjected to the greatest pressure along the diameter extending through the overlapped edges at 4 and the thickened portion at 3, and the metal at these points is given the greatest degree of compression. The thickened portion at 3, however, compensates for or balances the added thickness due to the overlapped edges at 4, and as a consequence the ball or mandrel is forced into the metal at these two points an equal amount, whereby the walls of the welded tube are of substantially the same thickness throughout and are not liable to be thick along the line 4 and thin on the line diametrically opposite the same, as is ordinarily the case. The plate 1 has the rib or thickened portion 3 formed thereon during the rolling of the plate, as will be readily understood, so that the plate can be as cheaply made as is the ordinary flat plate.

I am aware that it has been attempted heretofore to form a plate which is thicker at its transverse center than at its edges and gradually tapering in thickness from its center to its edges and then bending the same into skelp form and welding the same in the ordinary way. This plate, however, is open to the defect that more metal is contained therein than is necessary, as it is only that portion of the added metal which is diametrically opposite the overlapped edges of the plate which is at all useful or desirable in the process.

What I claim as my invention, and desire to secure by Letters Patent, is—

The method of making lap-weld metal tubes which consists in forming a plate having a longitudinal rib, or thickened portion at its transverse center and having substantially parallel faces from said rib to the edges of the plate, bending said blank plate into tubular form with its edges overlapping, and then heating and welding the overlapping edges of said plate whereby the walls of the tube are reduced to substantially a uniform thickness.

In testimony whereof I, the said PETER PATTERSON, have hereunto set my hand.

PETER PATTERSON.

Witnesses:
ROBERT C. TOTTEN,
F. W. WINTER.